(12) United States Patent
Ihara et al.

(10) Patent No.: US 7,055,811 B2
(45) Date of Patent: Jun. 6, 2006

(54) VIBRATION ISOLATING DEVICE

(75) Inventors: Yoshio Ihara, Osaka (JP); Hiroyuki Masuda, Osaka (JP); Hideaki Shimazu, Osaka (JP)

(73) Assignee: Toyo Tire and Rubber Co., Ltd., Osaka (JP)

( * ) Notice: Subject to any disclaimer, the term of this patent is extended or adjusted under 35 U.S.C. 154(b) by 24 days.

(21) Appl. No.: 10/838,707

(22) Filed: May 3, 2004

(65) Prior Publication Data
US 2005/0242481 A1 Nov. 3, 2005

(51) Int. Cl.
*F16F 5/00* (2006.01)
(52) U.S. Cl. .................................. 267/140.13
(58) Field of Classification Search ........... 267/140.11, 267/140.13
See application file for complete search history.

(56) References Cited

U.S. PATENT DOCUMENTS

| | | | | |
|---|---|---|---|---|
| 5,127,636 A | * | 7/1992 | Spaltofski | 267/140.13 |
| 5,582,394 A | * | 12/1996 | Bitschkus et al. | 267/140.13 |
| 5,964,456 A | * | 10/1999 | Someya | 267/140.13 |
| 6,241,223 B1 | * | 6/2001 | Gugsch et al. | 267/140.13 |
| 6,341,766 B1 | * | 1/2002 | Stiller et al. | 267/140.13 |
| 6,523,814 B1 | * | 2/2003 | Kodama et al. | 267/140.13 |
| 6,585,222 B1 | * | 7/2003 | Ihara et al. | 248/562 |
| 6,592,110 B1 | * | 7/2003 | Takashima et al. | 267/140.13 |
| 2003/0071401 A1 | * | 4/2003 | Kodama | 267/140.13 |

FOREIGN PATENT DOCUMENTS

| | | |
|---|---|---|
| JP | 63-27733 | 2/1988 |
| JP | 2-48629 | 4/1990 |
| JP | 9-257075 | 9/1997 |
| JP | 10-220508 | 8/1998 |
| JP | 2001-173699 | 6/2001 |
| JP | 2001-280404 | 10/2001 |
| JP | 2002-168288 | 6/2002 |

* cited by examiner

Primary Examiner—Christopher P. Schwartz
(74) Attorney, Agent, or Firm—Jordan and Hamburg LLP

(57) ABSTRACT

A vibration isolating device has a reduced dynamic spring constant in the fore-and-aft direction of a vehicle and can reduce effectively indoor noise upon acceleration and running at high speed. The device has a cylindrical main body fitting to be fixed to a vehicle body side, a boss fitting to be coupled to a vibration generator side, a rubber elastomer as a vibration isolator interposed between both, front and rear stopper rubber portions attached to a coupling member secured to an upside of the boss fitting, and a stopper member disposed in front of and in the rear of the stopper rubber portions and to be fixed to a vehicle body side. A small cavity is provided in at least one of the front and rear stopper rubber portions.

6 Claims, 5 Drawing Sheets

Comparative Example

VIBRATION ISOLATING DEVICE

BACKGROUND OF THE INVENTION

This invention relates to a vibration isolating device for supporting a power unit, mainly an automotive engine, etc. or another vibration generating bodies.

As a vibration-proof device for supporting a vibration generator such as an automotive engine so as not to transmit its vibrations to a vehicle body, etc., there are proposed vibration-proof devices having a variety of structures and configurations, whose fundamental construction is such that a vibration generator side member and a vehicle body side member are coupled by a rubber elastomer as a vibration isolator interconnected between them and the vibration generator side member is supported in a vibration-proof manner by the rubber elastomer, for example, a non-liquid-sealed type of one availing oneself of characteristics of the rubber elastomer only to damp the vibrations, a liquid-sealed type of one, wherein liquid is filled within the main body to avail oneself of liquid fluidization effect of an orifice, etc. (cf. e.g. JP Patent Application Publication H10-220508 A, JP Patent Application Publication 2001-280404A).

A vibration-proof device in FIG. 6 is a vibration isolating device pertaining to a comparative example, which it is possible to use so as to support a power unit such as an automotive engine at its lateral position. The device comprises a cylindrical main body fitting 101, a boss fitting 102 disposed rather upwardly of it in the axis center part and to be coupled to a vibration generator side, a rubber elastomer 103 as a vibration isolator interposed between the cylindrical main body fitting 101 and the boss fitting 102 in a manner coupling both, a coupling member 104 with a vibration generator to be secured to the upside of the boss fitting 102, a stopper rubber 105 attached to the coupling member 104, and an arch-shaped stopper member 107 to be fixed to a vehicle body side in forward and rearward parts of the device and positioned while holding a required distance from the stopper rubber 105 in its front and rear parts and upper part, wherein it is constructed so that the rubber elastomer 103 may absorb and damp vibrations from the engine and the stopper rubber 105 may abut on the stopper member 107 thereby regulating a large displacement in the fore-and-aft direction and the upward direction.

In the aforementioned vibration isolating device, front and rear rubber portions 151, 152 of the stopper rubber 105 serve to abut on the stopper member 107 in response to displacements in the fore-and-aft direction of the vibration generator side, thereby performing a stopper action regulating a further greater displacement. Upon running, however, due to the fact that the stopper rubber 105 abuts on the stopper member 107, the dynamic spring constant in the fore-and-aft direction is apt to become high and there is a tendency that a damping effect mainly to vibrations with a relatively small amplitude cannot be sufficiently obtained.

In particular, upon acceleration or running of a vehicle at such a high speed that engine revolution is on the order of 2500 rpm to 4000 rpm, the coupling member 104 at the vibration generator side is displaced rearwards and the rear rubber portion 152 of the stopper rubber 105 remains abutting on the stopper member 107. As a consequence, upon acceleration or running at high speed of a vehicle such as an automobile, vibrations and noise at the vibration generator side are liable to be transmitted to the vehicle body side, with the result that the indoor noise becomes large.

Yet, varying the characteristics of the stopper rubber 105 such as elastic force by the change of material will result in diminishing a spring force upon stopper action and is likely to impair the stopper action and durability.

Stated another way, it is desired in the aforementioned vibration isolating device that the degree of initial abutment of the stopper rubber 105 on the stopper member 107 be relatively soft such that the dynamic spring constant in the fore-and-aft direction can be reduced and the stopper action can be reliably performed; and that upon acceleration or running at high speed of a vehicle, the transmission of noise to the vehicle body side can be suppressed.

SUMMARY OF THE INVENTION

In view of the problems described above, this invention has been made, and is designed to provide such a vibration isolating device that can reduce the dynamic spring constant in the fore-and-aft direction of the aforesaid vibration isolating device provided with the stopper structure without affecting its characteristics such as durability, stopper action, etc. and further such a vibration isolating device that can effectively reduce the indoor noise upon acceleration or running at high speed.

To solve the aforesaid problems, this invention consists in a vibration isolating device which comprises a first cylindrical fitting to be fixed to a vehicle body side, a second fitting positioned rather upwardly of the first fitting in its axis center part and to be coupled to a vibration generator side, a rubber elastomer interposed between the first fitting and the second fitting, front and rear stopper rubber portions both attached to a coupling member with an upside of the second fitting or a vibration generator to be secured to the upside of the second fitting, and a fore-and-aft stopper member disposed in front of and in the rear of the stopper rubber portions and to be fixed to a vehicle body side, whereby the stopper rubber portions and the stopper member perform a stopper action in the fore-and-aft direction, wherein the device is characterized in that a small cavity is provided in at least one of the front stopper rubber portion and the rear stopper rubber portion. It is particularly preferred that the small cavity be provided at least in the rear stopper rubber portion.

According to this vibration isolating device, it supports and bears the load of the vibration generator through the second fitting by the rubber elastomer as a vibration isolator so as not to transmit vibrations to the vehicle body, etc. In that condition, against vibrational displacements in the fore-and-aft direction at the vibration generator side upon running of a vehicle, the aforesaid front and rear stopper rubber portions abut on the stopper member thereby performing a stopper action in the fore-and-aft direction. With this invention, in particular, due to the fact that the small cavity is provided at least in one of the front and rear stopper rubber portions, the stopper rubber portions are susceptible of elastic deformation up to a some degree of amplitude range and their abutment on the stopper member becomes softened.

For that reason, it is possible to diminish the dynamic spring constant in the fore-and-aft direction, and good vibration isolating characteristics can be exhibited to vibrations of a relatively small amplitude. This effect is particularly remarkable in cases where both front and rear stopper rubber portions are provided with the small cavity. Besides, upon vibration in a large amplitude, the small cavity is collapsed with its wall faces clinging to each other, and the spring force as a stopper becomes large, whereby it is possible to perform likewise a good stopper action as in the conventional device and to maintain a good durability, as well.

In particular where at least the rear stopper rubber portion is provided with the small cavity, the coupling member with the vibration generator is displaced rearwards upon acceleration or running of a vehicle at high speed with an engine revolution of 2500 rpm to 4000 rpm, and as a result, the vibration transmission to the vehicle body side is suppressed in the condition that the rear stopper rubber portion abuts on the stopper member, even though it remains in that abutment condition, and accordingly, the noise of the vehicle room can be reduced.

The small cavity provided in at least one of the front and rear stopper rubber portions may assume either a through-hole or a non-piercing hole in an intersecting direction to the fore-and-aft direction, and it is possible to set appropriately the rigidity of the stopper rubber portions depending upon the diameter, shape, etc. of the hole.

According to the vibration isolating device of this invention, it is thus possible to reduce the dynamic spring constant in the fore-and-aft direction without affecting the durability, stopper action or other characteristics thereby retaining good vibration isolating characteristics and further to reduce effectively the noise in the vehicle room upon acceleration or running at high speed.

BEST MODE FOR CARRYING OUT THE INVENTION

Now the embodiments for carrying the invention into effect will be described with reference to the drawings.

Figure 1:
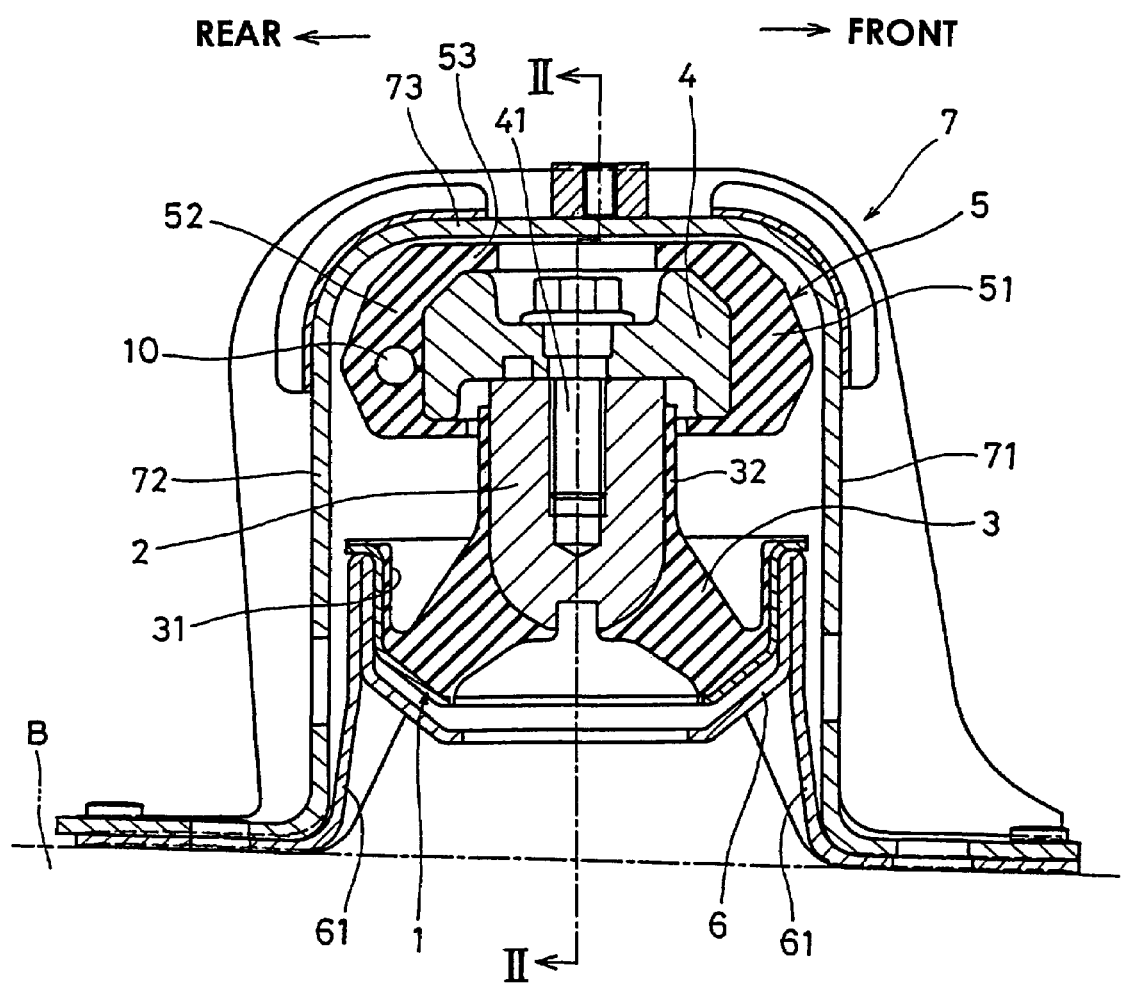
FIG. 1 is a longitudinal sectional view showing one example of a vibration isolating device pertaining to this invention.
Figure 2:
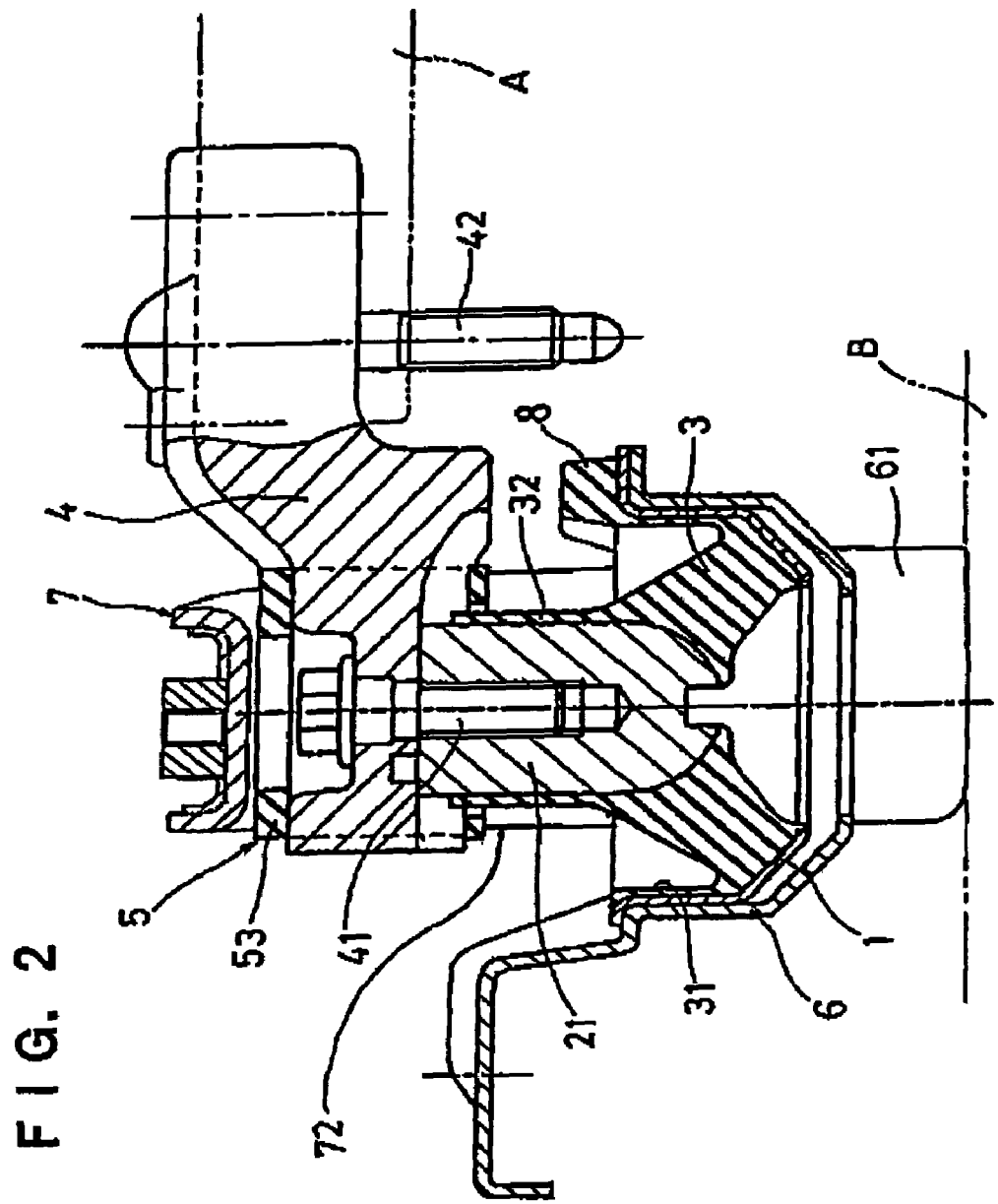
FIG. 2 is a longitudinal sectional view taken along 11—11 line of the previous figure.
Figure 3:
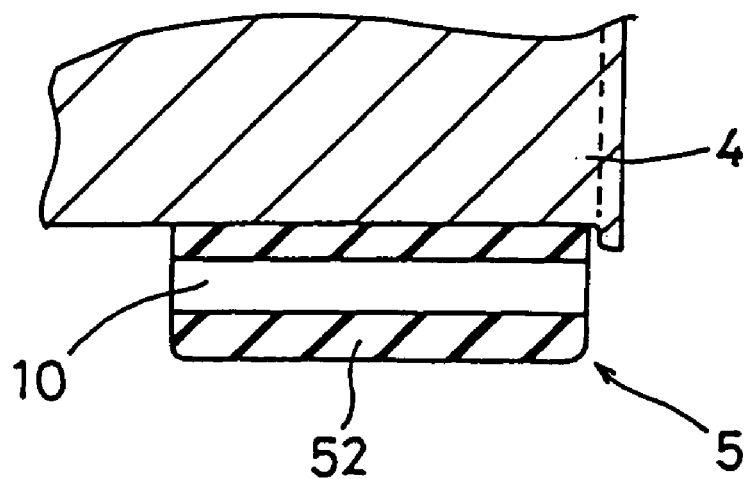
FIG. 3 is a transverse sectional view of a small cavity portion of the foregoing device.
Figure 4:
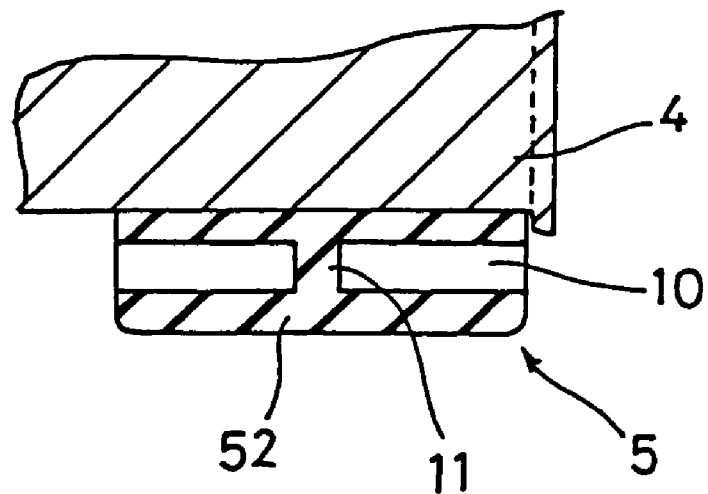
FIG. 4 is a transverse sectional view of a small cavity portion showing another example.
Figure 5:
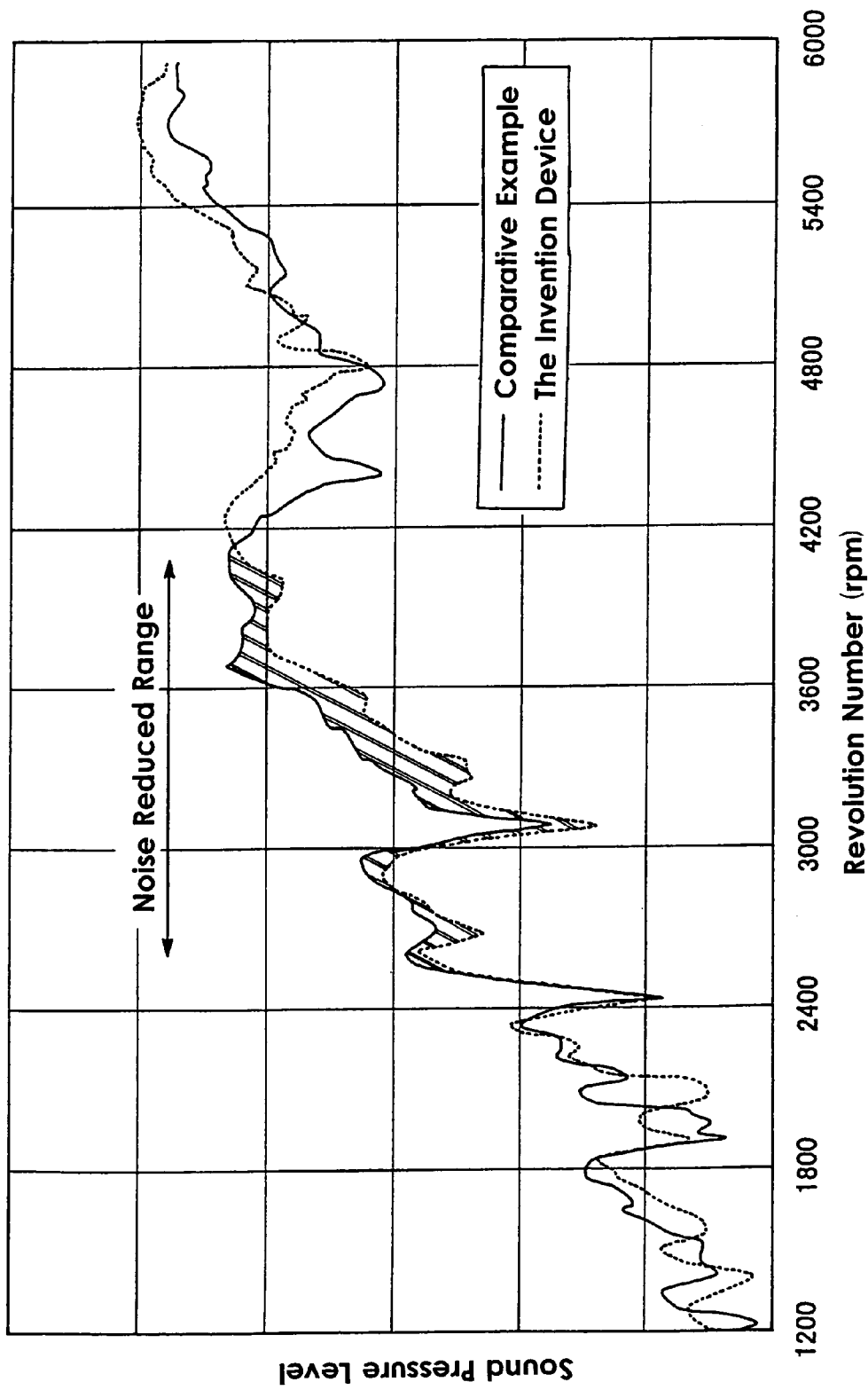
FIG. 5 is a graph showing comparison of the indoor noise on the invention device and a device of a comparative example.

FIG. 1 is a longitudinal sectional view showing one example of a vibration isolating device relating to this invention; FIG. 2 is a longitudinal sectional view taken along II—II line of the preceding figure; FIG. 3 and FIG. 4 are transverse sectional views of a small cavity portion; FIG. 5 is a graphical presentation showing a comparison of the indoor noise between the invention device and the vibration isolating device in the comparative example.

In the figures, the reference numeral 1 stands for a cylindrical main body fitting (first fitting) to be fixed to a vehicle body side, as will be later described, which assumes a generally cup shape of an open bottom, 2 a boss fitting (second fitting) disposed rather upwardly of an axis center part of the first fitting, and 3 a rubber elastomer as a vibration isolator, which is secured by vulcanization bonding means and interposed between an inner peripheral face of a lower part of the cylindrical main body fitting 1, for example, the lower part assuming an inwardly facing taper shape as shown and a lower outer peripheral face of the boss fitting 2. The rubber elastomer 3 basically assumes a thick-walled, generally truncated conical shape as illustrated. On the inner peripheral face of the cylindrical main body fitting 1, a rubber layer 31 integral with the rubber elastomer 3 is provided for the protection purpose while on the outer peripheral face of the boss fitting 2, there is also provided a rubber layer 32 integral with the rubber elastomer 3.

The reference numeral 4 designates a coupling member with a vibration generator side secured to the boss fitting 2. The coupling member 4 is disposed so that its one end part may be fixed to the upside of the boss fitting 2, for example, by a fastening means through a bolt 41 and its other end part extending in the one of lateral directions from the fixed part may be coupled and secured to a member A at the side of a vibration generator, e.g. engine through a bolt fastening means 42.

The reference numeral 5 is a stopper rubber attached to an outer periphery of the one end part of the coupling member 4 constituting the aforementioned fixed part through vulcanization bonding means so as to cover at least front and rear parts and an upper part of the coupling member 4, wherein the front and rear parts and the upper part are formed integrally as front and rear stopper rubber portions 51, 52, and an upper rubber portion 53, respectively.

The front and rear stopper rubber portions 51, 52 are not limited to the stopper rubber 5 integrally formed as illustrated, but may be formed separately forward and rearward. Otherwise it is possible to provide the stopper rubber portions 51, 52 above the boss fitting 2 depending upon the configuration of the boss fitting 2 or the coupling structure of the boss fitting 2 and the vibration generator side member A.

The reference numeral 6 designates a retainer cylinder assuming a generally cup shape of an open bottom and fixedly holding the cylindrical main body fitting 1 in place by press fitting, as illustrated The retainer cylinder 6 is provided to extend forwardly and rearwardly and laterally to downwardly and is bent outwardly and extended to form generally L-shaped leg portions 61, 61, which are adapted to be fixed to a vehicle body side member B such as a vehicle body frame through a fastening means such as a bolt and nut (not shown), thereby supporting the cylindrical main body fitting 1 press fitted and fixed as described above, slightly above the vehicle body side member B. Naturally it is also possible to couple and fix another support means to the outer periphery of the cylindrical main body fitting 1.

The reference numeral 7 designates a stopper member assuming an arch shape as illustrated that is fixed to the vehicle body side member B together with the leg portions 61, 61 of the retainer cylinder 6 in the front and rear parts of the device. The stopper member 7 is disposed to straddle fore and aft the stopper rubber 5 attached on the outer periphery of the coupling member 4, namely the front and rear stopper rubber portions 51, 52 and the upper rubber portion 53 so as to hold a required distance preset to accommodate the vibration isolating function and the stopper action.

Specifically stated, the stopper rubber 5 is attached to the place of the coupling member 4 corresponding to the inward part of the stopper member 7. Thereby against vibrational displacements of the coupling member 4 in the fore-and-aft direction, the front and rear stopper rubber portions 51, 52 being relatively thick-walled abut on front and rear prop portions 71, 72 of the stopper member 7, thereby performing a stopper action. On the other hand, against upward displacement of the coupling member 4, the upper rubber portion 53 abuts on an upside 73 of the stopper member 7 thereby performing a stopper action. The reference numeral 8 is a stopper rubber portion regulating a downward displacement of the coupling member 4. FIGS. 1 and 2 indicate a nor-loaded condition.

The aforesaid stopper member 7 is not always necessary to be arch-shaped as illustrated, but may be a stopper member separated in the fore-and-aft direction. It is also possible to fix and dispose the stopper member to the open end of the retainer cylinder by caulking means.

Again in the vibration isolating device of this invention, of the front and rear stopper rubber portions 51, 51, at least the one, for example, the rear stopper rubber portion 52 in the figures is provided with a small cavity 10 of a through-hole with one diameter in an intersecting direction to the fore-and-aft direction as shown in the sectional view of FIG. 3. Thereby the abutment when the stopper rubber portion 52 abuts on the stopper member 7 is alleviated and the dynamic spring constant in the fore-and-aft direction can be reduced.

That is, in the condition that the automotive engine is supported, the front and rear stopper rubber portions 51, 52 abut on the stopper member 7 against vibrational displacements in the fore-and-aft direction of the vibration generator side upon running of the vehicle, thereby performing a stopper action regulating a further large displacement. At that time, because of the small cavity 10 provided at least in the one of the front and rear stopper rubber portions 51, 52, at least the one stopper rubber portion 51 and/or 52 is susceptible of elastic deformation up to a some degree of amplitude range and is moderate to abut on the stopper member 7.

Therefore it is possible to reduce the dynamic spring constant in the fore-and-aft direction and to exhibit a good vibration isolating characteristic to vibrations of a relatively small amplitude. In particular, in a case where the small cavity is provided in both the front and rear stopper rubber portions 51, 52, the abutment is softened in either direction of the forward and rearward directions and consequently, the reduction effect of the dynamic spring constant is further increased. Moreover, upon vibration in a large amplitude, the small cavity 10 is collapsed and its wall faces cling together, whereby the spring force as a stopper is increased, thus performing likewise a good stopper action as heretofore without impairing the durability.

Upon acceleration or running of a vehicle at high speed of an engine revolution of 2500 rpm to 4000 rpm, the coupling member 4 at the vibration generator side is displaced rearward and the rear stopper rubber portion 52 remain in abutment on the stopper member 7. Nonetheless in cases where at least the rear stopper rubber portion 52 has the small cavity 10 as in the illustrated example, because of the fact that abutment of the rear stopper rubber portion 52 on the stopper member 7 is softened, the vibration transmission in that condition to the vehicle body side is suppressed, whereby it is possible to reduce the indoor noise as compared with the conventional product.

Various variations are possible in regard to the configuration (sectional shape), size, arrangement position and number, piercing direction, etc. of the small cavity 10 so as to accommodate the rigidity, dynamic spring constant and vibration isolating characteristic as required.

For instance, aside from the aforesaid through-hole, the small cavity 10 may be a non-piercing hole formed to leave a non-piercing portion 11. With the small cavity 10 in the form of this non-piercing hole, the position and wall thickness of the non-piercing portion 11 can be set appropriately, and tuning of the rigidity is also facilitated by varying the position and the wall thickness or the hole diameter.

In either case of the through-hole or non-piercing hole, the small cavity 10 is formed in an intermediate part in wall thickness of the front or rear stopper rubber portion 51 or 52, and besides, the small cavity can be alternatively disposed in the vicinity of an end portion of the front or rear stopper rubber portion or in an adjacent position to the coupling member 4. Further it is possible to dispose a plurality of them in the front and rear stopper rubber portions 51 and/or 52, to make the sectional shape of the hole a generally triangular shape or a flat shape, and to arrange the holes in the longitudinal direction. In either case, it is possible to alleviate the abutment on the stopper member likewise as above, to reduce the dynamic spring constant in the fore-and-aft direction, and to reduce the transmission of noise upon acceleration or running at high speed.

Figure 6:
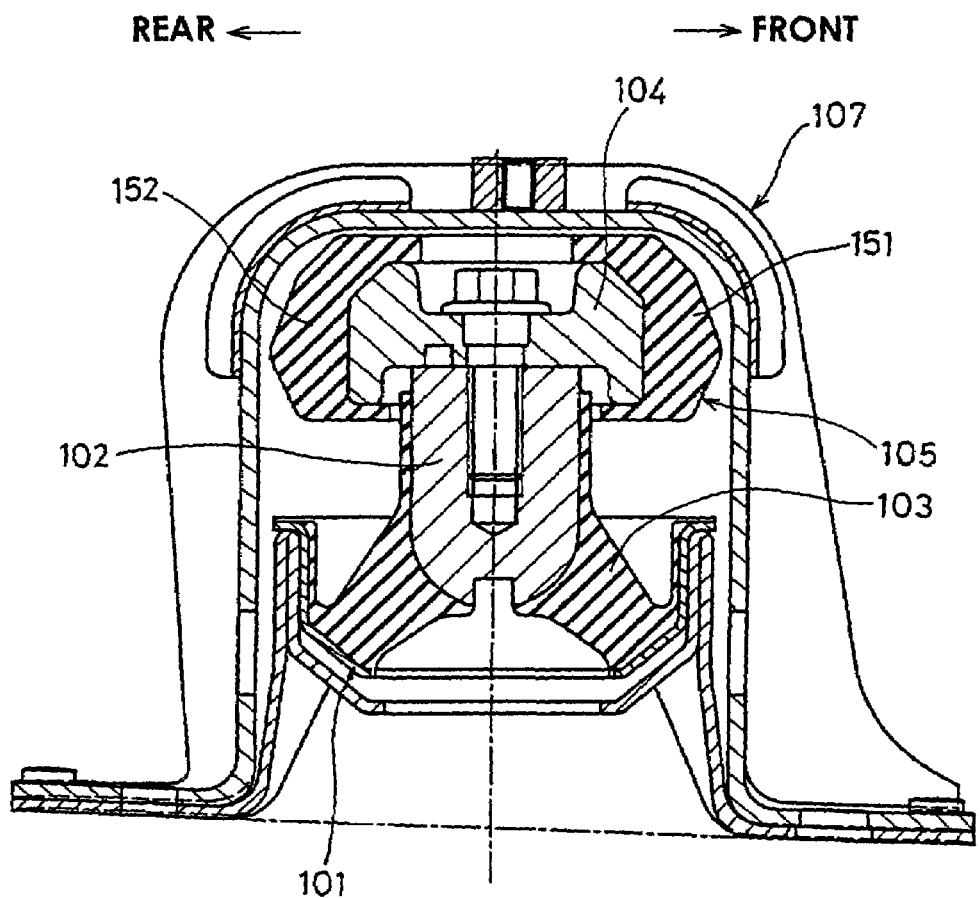
FIG. 6 is a longitudinal sectional view showing a vibration isolating device in the comparative example.

FIG. 5 shows measurement results of sound pressure level measured at the driver's seat side in the vehicle room by varying revolution number of respective engines in order to compare a case where the invention device of a stopper rubber structure with the small cavity in the example in FIG. 1 is used as a mount supporting an engine installed on an automobile and a case where the vibration isolating device of a stopper rubber structure without small cavity relating to the comparative example in FIG. 6 is used as an engine mount. In that figure, the solid line shows the vibration isolating device in the comparative example whereas the dot line shows the invention device.

As will be apparent from the measurement results, the sound pressure level of the invention device is lowered by several decibels to 5 decibels (the hatching part in FIG. 5) in a range of an engine revolution number of 2500 rpm to 4000 rpm as compared to the comparative example, and it is seen that the noise can be reduced according to the device of this invention.

In the illustrated examples, a vibration isolating device of a non-liquid sealed type availing oneself of a rubber elastomer only is shown, but this invention can also be carried into effect likewise in a liquid-sealed type of vibration-proof device and can achieve a similar effect.

The invention claimed is:

1. A vibration isolating device comprising:
    a first cylindrical fitting to be secured to a vehicle body side,
    a second fitting disposed upwardly of the first fitting along an axis center part of the first fitting and having a coupling member to be coupled to a vibration generator side,
    a rubber elastomer interposed between and interconnecting the first fitting and the second fitting,
    a front stopper rubber portion and a rear stopper rubber portion both having a mounted side attached to said coupling member of the second fitting or to a vibration generator to be fixed to the upside of the second fitting, said front and rear stopper rubber portions being separated from said first cylindrical fitting,
    a fore-and-aft stopper member disposed in front of and in back of and not connected to the front and rear stopper rubber portions, said fore-and-aft stopper member to be fixed to a vehicle body side, said front and rear stopper rubber portions respectively opposing portions of said fore-and-aft stopper member and defining gaps therebetween, said front and rear stopper rubber portions and the stopper member being relatively displaceable to close said gaps and engage one another to perform a stopper action in a fore-and-aft direction,
    at least one of said front and rear stopper rubber portions defining a cavity, said at least one of said front and rear stopper rubber portions having a tapered end portion for engaging said fore-and- falt stopper member, said tapered end portion having a tip and upper and lower inclined faces extending from said tip to face ends of said upper and lower inclined faces, said tip and said face ends defining a hypothetical tapered end triangular vertical cross section, and said cavity being disposed outside of said tapered end triangular vertical cross section and between said tapered end triangular vertical cross section and said mounted side of said at least one of said front and rear stopper rubber portions.

2. The vibration isolating device as set forth in claim 1, wherein said cavity is provided at least in the rear stopper rubber portion.

3. The vibration isolating device as set forth in claim 2, wherein said cavity is a through-hole piercing in an intersecting direction to the fore-and-aft direction.

4. The vibration isolating device as set forth in claim 2, wherein said cavity is a non-piercing hole extending in an intersecting direction to the fore-and-aft direction.

5. The vibration isolating device as set forth in claim 1, wherein said cavity is a through-hole piercing in an intersecting direction to the fore-and-aft direction.

6. The vibration isolating device as set forth in claim 1, wherein said cavity is a non-piercing hole extending in an intersecting direction to the fore-and-aft direction.

* * * * *